United States Patent [19]
Nielsen

[11] Patent Number: 5,495,992
[45] Date of Patent: Mar. 5, 1996

[54] BELT-DRIVEN MAGNETIC TAPE CARTRIDGE HAVING A DEVICE FOR APPLYING MECHANICAL TENSION TO THE TAPE IN THE CARTRIDGE

[75] Inventor: Oivind A. Nielsen, Oslo, Norway

[73] Assignee: Tandberg Data A/S, Oslo, Norway

[21] Appl. No.: 868,703

[22] Filed: Apr. 15, 1992

[30] Foreign Application Priority Data

Feb. 12, 1992 [DE] Germany .......................... 42 04 134.1

[51] Int. Cl.⁶ ................................................. G11B 23/087
[52] U.S. Cl. ...................................... 242/346.1; 360/132
[58] Field of Search .................................... 242/199, 200, 242/197, 198; 360/132

[56] References Cited

U.S. PATENT DOCUMENTS

| | | | |
|---|---|---|---|
| 3,915,409 | 10/1975 | Satou | 242/199 |
| 4,606,513 | 8/1986 | Gelardi et al. | 242/199 |
| 4,646,188 | 2/1987 | Kato et al. | 242/199 |
| 4,813,628 | 3/1989 | Tollefson | 242/199 |
| 4,881,696 | 11/1989 | Mizutani et al. | 242/199 |
| 5,204,796 | 4/1993 | Koizumi et al. | 242/199 |

OTHER PUBLICATIONS

"Endless Belt Drives Cassette Tape 2×90 minutes for Dictating," RME, vol. 41, No. 5 (1975), p. 187.

*Primary Examiner*—William A. Cuchlinski, Jr.
*Assistant Examiner*—William C. Dowling

[57] ABSTRACT

A device for applying a mechanical tension to a tape in a cartridge of the type having an internal belt for moving the tape, particularly a fast-running tape that is to be unwound from a first reel and to be wound onto a second reel, the reels mounted on respective reel hubs and the tape being guided around at least two guide rollers between which it runs in an essentially straight line path between two guide rollers, has at least one assembly for mechanically pre-loading the tape with variable force provided between one of the guide rollers and the reel hub lying closest to it for tensioning the tape in the straight line path between the guide rollers.

4 Claims, 4 Drawing Sheets

BELT-DRIVEN MAGNETIC TAPE CARTRIDGE HAVING A DEVICE FOR APPLYING MECHANICAL TENSION TO THE TAPE IN THE CARTRIDGE

BACKGROUND OF THE INVENTION

1. Field of the Invention

The invention is directed to a device for applying mechanical tension to a tape placed into a cartridge, particularly a fast-running tape, which is to be unwound from a first reel and is to be wound onto a second reel, wherein the reels lie on respective reel hubs and wherein the tape is guided around at least two guide rollers, between which the tape runs essentially in a straight line wherein the reels are driven by an internal belt.

2. Description of the Prior Art

The mechanical tension of a tape, particularly of a magnetic tape, is of importance for maintaining good contact of the magnetic tape with a write/read head. Good contact is guaranteed given a high tension, whereas it is possible that the tape will flutter over the head given a low tension. Irregularities on the tape can also be the cause of a lift-off of the tape from the head. Relatively low tape tensions particularly occur when the tape is stopped and placed back into motion. The tape must then run for a certain time until the required tension for contact with the head is again built up. Additionally, the tape tension always drastically drops when the running direction is changed.

The difficulties are further intensified when the linear tape density, i.e. the number of bit transitions per mm, is increased. A high density results in an increased signal loss when the exact write or read position is not observed. Since the losses for a given distance between the tape and the head exponentially rise with the wavelength of the signal, the problem of lift-off of the tape from the head becomes more critical as the signal density increases.

In general, a high tape tension can contribute to producing the required, good tape-to-head contact, even when there are slight tape irregularities.

In conventional cartridges, the mechanical tension is generated for the tape by a belt that, inside the cartridge, runs along the tape wound onto reels. The belt is driven from the exterior of the cartridge and thereby in turn moves the tape; the motion of the tape then builds up the tape tension. This basic principle for building a mechanical tension on the tape has been followed unmodified for nearly 20 years. Although it would be possible to increase the tape tension in such cartridges so that a higher friction is generated at rollers around which the belt is guided (preferably at the rollers that are arranged in the corners of the cartridge), an increased friction at these rollers requires a higher torque that must be exerted in order to move the overall arrangement. This requires that a more powerful motor be provided, and thus a larger motor as a rule. Additionally, far more heat is dissipated. This approach would also have the disadvantages that the difference in the respective stiffnesses of the tape and belt would be more pronounced, and thus undefined conditions would initially prevail after the tape is started until a stable tape tension has been achieved in an equilibrium condition.

The aforementioned problems are further intensified in fast-running tapes, i.e. particularly given applications in streamers.

SUMMARY OF THE INVENTION

It is therefore an object of the present invention to provide a device for applying mechanical tension to a tape placed into a cartridge, particularly a fast-running tape transported by means of an internal belt, with which it is guaranteed that an adequately high tape tension for good contact with the write/read head is immediately present when tape movement is started, or when the moving direction of the tape is changed, and that this contact be maintained when irregularities occur in the tape running or in the tape itself.

The above object is achieved in accordance with the principles of the present invention in a cartridge wherein the tape is transported by an internal belt, partially wrapping the tape on two reel hubs within the cartridge, the tape traveling in a substantially straight line path between two guide rollers, and the cartridge having at least one device for mechanically pre-loading the tape with variable force at least in the region of one of the guide rollers and of the reel hub lying closest to it. The tape tension between the guide rollers is thereby set according to the internal prescriptions of the device for mechanically pre-loading the tape, and the tension is thus set dependent on the current momentary tape tension. When an adequately high tape tension prevails even before tape movement begins then, when loading by a spring is applied during the movement, only a slight spring excursion will be necessary in order to set the optimum tape tension. A lower tape tension, by contrast, requires a longer spring excursion until the tape is so tautly guided that it can exert the counter-force corresponding to the impressed force.

According to a first embodiment, the device for pre-loading the tape is a spring-loaded bow that is pivotable around an axis which is parallel to the reel hub, and the bow having a distal end disposed against the tape. The force applied to the tape by the bow varies dependent on the size of the pivot angle.

Dependent on the space available in the cartridge, the bow can be fashioned with different shapes such as proceeding straight or curved from its pivot axis to its distal end.

According to second embodiment, the device for mechanically pre-loading the tape is a spring-loaded pin disposed against the tape that is movable along a prescribed or prescribable path and whose longitudinal axis is aligned essentially parallel to the reel hub. The force applied by the pin to the tape is varied in this embodiment by varying the distance traversed by the pin along the path.

The path can proceed on a straight line or curved; the corresponding guide is formed, for example, by an oblong hole in which the pin is partially engaged.

The spring loading can also be generated by a coil spring in all embodiments of the invention.

DESCRIPTION OF THE PREFERRED EMBODIMENTS

Figure 1:
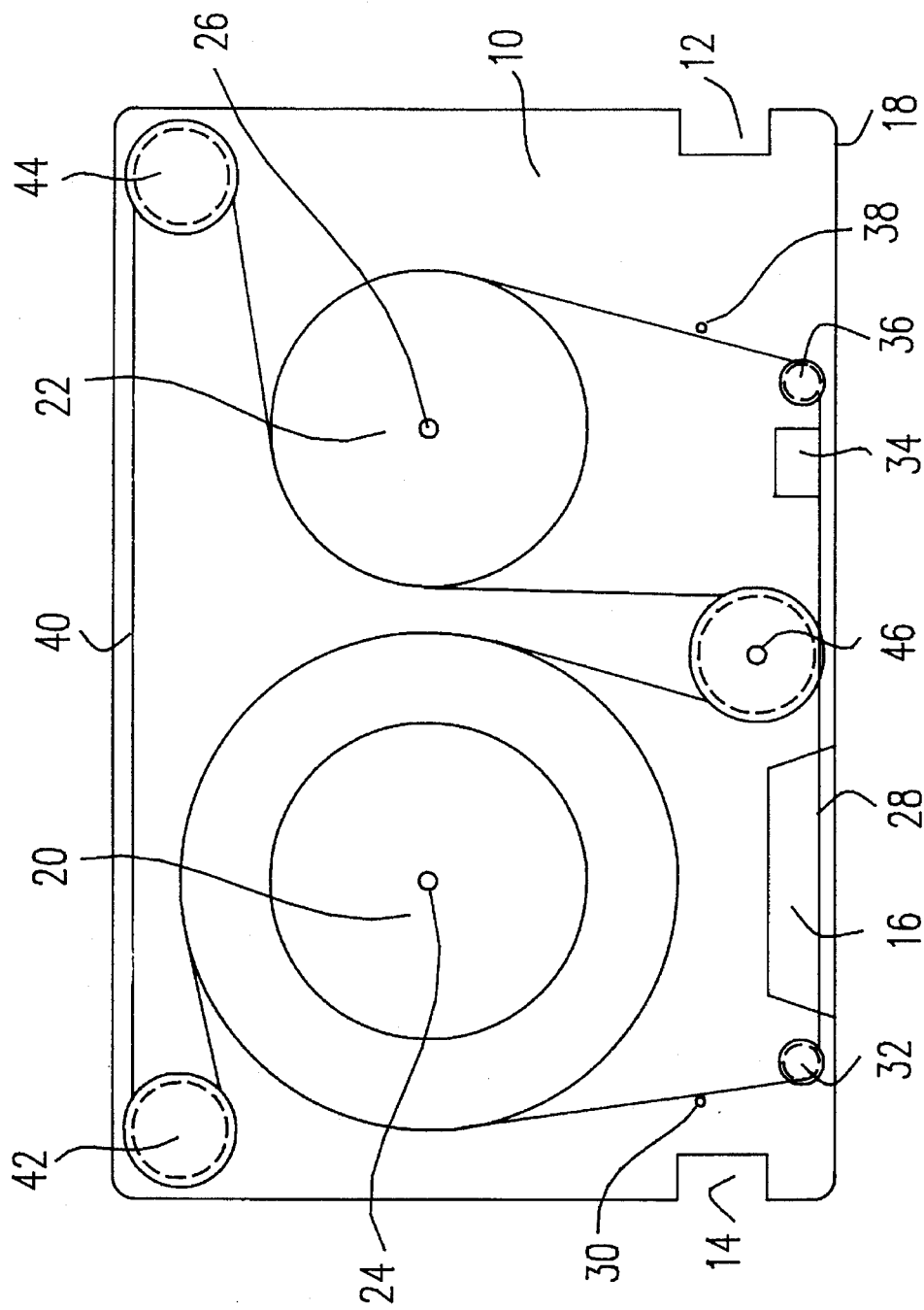
FIG. 1 is a plan view of a prior art cartridge having a tape placed therein with the cartridge housing removed.

FIG. 1 shows a view onto a base plate of a cartridge of the type known in prior art, having a tape therein and having a tape drive and with the cartridge housing removed. At its two shorter sides, the essentially rectangular base plate 10 has a respective recess 12 and 14 in the two corner regions, these recesses serving the purpose of aligning the cartridge in a tape read or write unit. A further, trapezoidal recess 16 is situated close to the recess 14 at the long side 18 of the base plate 12 in the front region defined by the position of the two recesses 12 and 14. This trapezoidal recess 16 is closed with a pivotable cover (not shown). The cover is pivotably attached to the cartridge housing so as to pivot when the cartridge is introduced into a read or write unit and enables access of a magnetic head, for example a write/read head, to a tape 28 that runs past the recess 16. The tape 28 is wound onto two reels 20 and 22 that are rotatable around respective reel hubs 24 and 26. Dependent on the running direction of the tape 28, it is wound onto one of the reels and unwound from the other. Two guide rollers 32 and 36 are rotatably seated at a distance from one another in the region of the front longitudinal edge 18 of the base plate 12. These guide rollers 32 and 36 have a friction coat and guide the tape 28 between them on an essentially straight line, parallel to the longitudinal edge 18. Guide pins 30 and 38, along which the tape 28 runs in gliding fashion, are also provided close to the guide rollers 32 and 36 but at a greater distance from the longitudinal edge 18 than the guide rollers 32 and 36. A system composed of an endless belt 40 and rollers 42, 44 and 46 serves as a tape drive. Two of the rollers 42 and 44 are respectively situated in the regions of the base plate 10 opposite the longitudinal edge 18. The third roller 46, the actual drive roller, is in the proximity of the longitudinal edge 18, and has a rotational axis which essentially lies in the center plane between the two reel hubs 24 and 26. The endless belt 40 is guided such that, first, it runs around the rollers 42 and 44, then along the reel 26 in frictional contact with the tape 28, subsequently around the drive roller 46 (the tape 28 conducted by this location lying on the belt), and finally around the reel 20 back to the roller 42, again in frictional contact with the tape situated on the reel. A suitable prime mover places the drive roller 46 in rotation and thus moves the endless belt 40 that in turn acts on the tape 28 and, after a certain time after which an equilibrium between the tensions of endless belt 40 and tape 28 has occurred, generates a tape running with a tape tension that is essentially defined by the properties of the endless belt 40. A mirror 38 with which the position of the tape 28 can be monitored is provided close to the guide roller 36.

This fundamental structure has been retained for the individual embodiments of the invention. The guide pins 30 and 38 are, however, no longer employed either in the example of FIG. 2 or in the example of FIGS. 3 and 4. The reference numerals for FIG. 1 identify the same elements in FIGS. 2 and 3.

Figure 2:
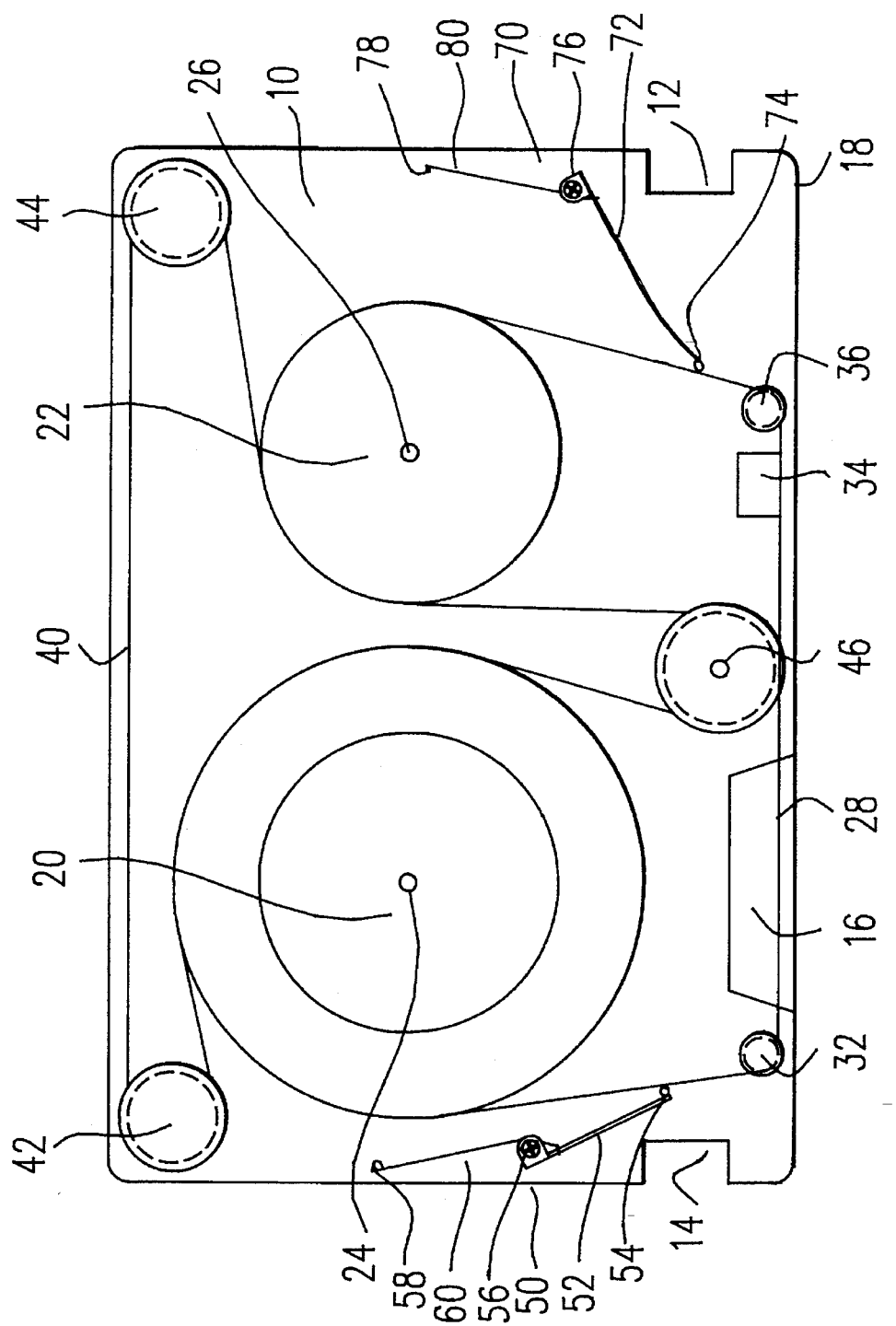
FIG. 2 is a plan view of a cartridge constructed in accordance with the principles of the present invention, with the housing removed, in a first embodiment.

A first embodiment of the invention is shown in FIG. 2. Assemblies 50 and 70 for mechanically pre-loading the tape with variable force are arranged on the base plate 10 for respectively acting on the tape 28 on its path from the reel 20 to the guide roller 32 and from the guide roller 36 to the reel 22. The effective position of the force thereby essentially corresponds to the position of the guide pins 30 and 38 of the cassette of the prior art as shown in FIG. 1. The assembly 50, referred to below as a prestress assembly, is composed of a bow 52 that is pivotable around an axle 56 that extends perpendicularly from the base plate 10, i.e., is aligned essentially parallel to the reel hub 24. The distal end of the bow 52 forms a seating region 54 against the tape 28. A coil (torsion) spring 60 is placed around the axle 56, the coil spring 60 being secured to the bow 52 and being held by a supporting pin 58 (and possibly by projections and the like provided in the cartridge housing not shown here) so that a spring force can be exerted on the bow. The bow 52 in the prestress assembly 50 is straight and is thus pivoted by a defined angle that is dependent on the momentary tension of the tape 28 at the seating region 54. Correspondingly, the prestress assembly 70 is provided in the region of the opposite lateral edge of the base plate 10, so that the effective position of the force applied thereby acts on the tape 28 at the location of the guide pin 38. The prestress assembly 70 is composed of a bow 72 which proceeds curved from the rotational axis 76 to the seating region 74. A coil (torsion) spring 80 is secured to the bow 72 and to a supporting pin 80 (or to projections of the cartridge housing or the like), so that the required force can be applied to the bow 72.

It will be understood that the bow 52 is shown straight and the bow 72 is shown curved only for exemplary purposes. Depending on space limitations, both may be straight or both may be curved, or the bow 52 may be curved and the bow 72 straight.

Figure 3:
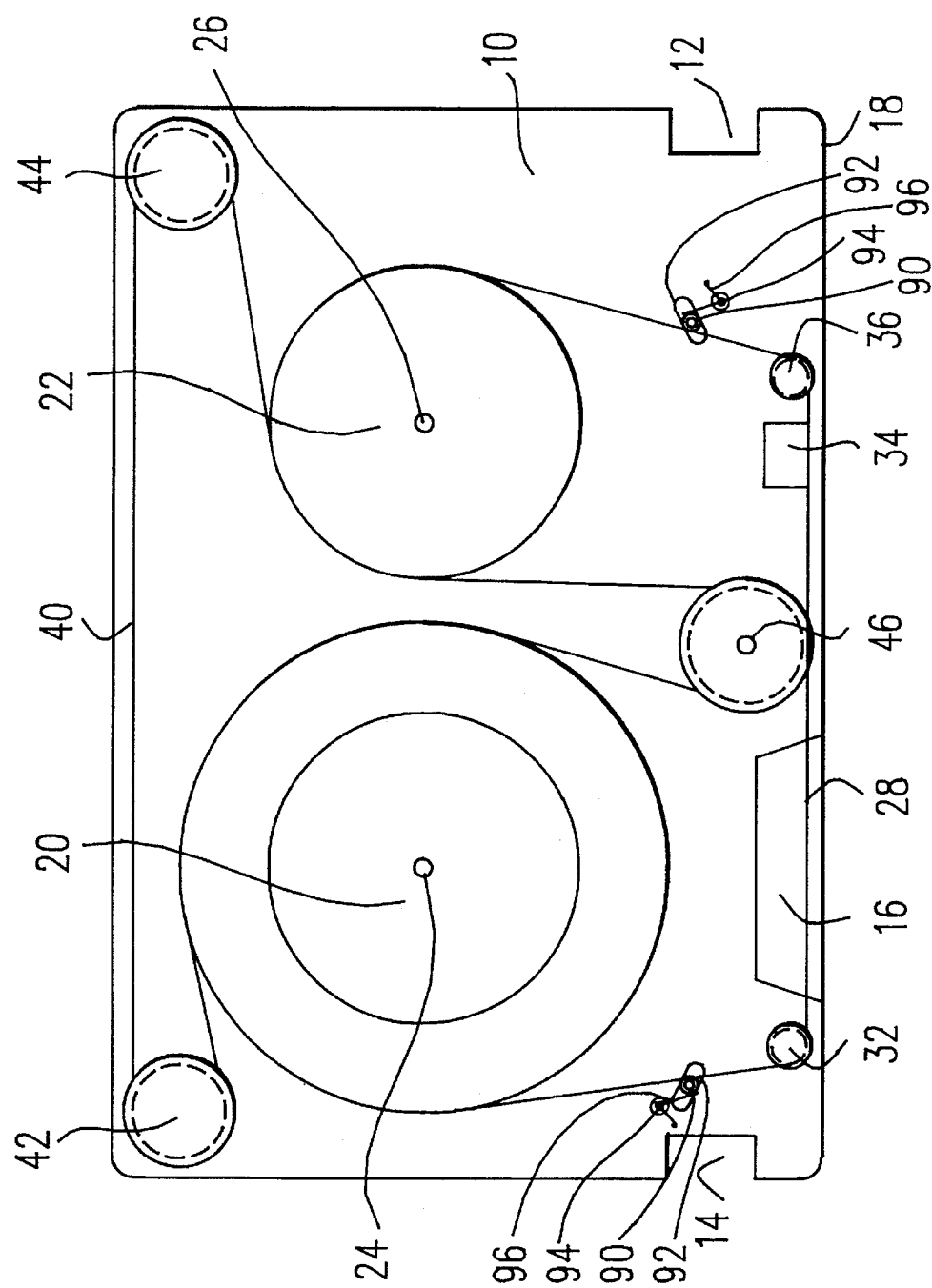
FIG. 3 is a plan view of a cartridge constructed in accordance with the principles of the present invention, with the housing removed, in a second embodiment.
Figure 4:
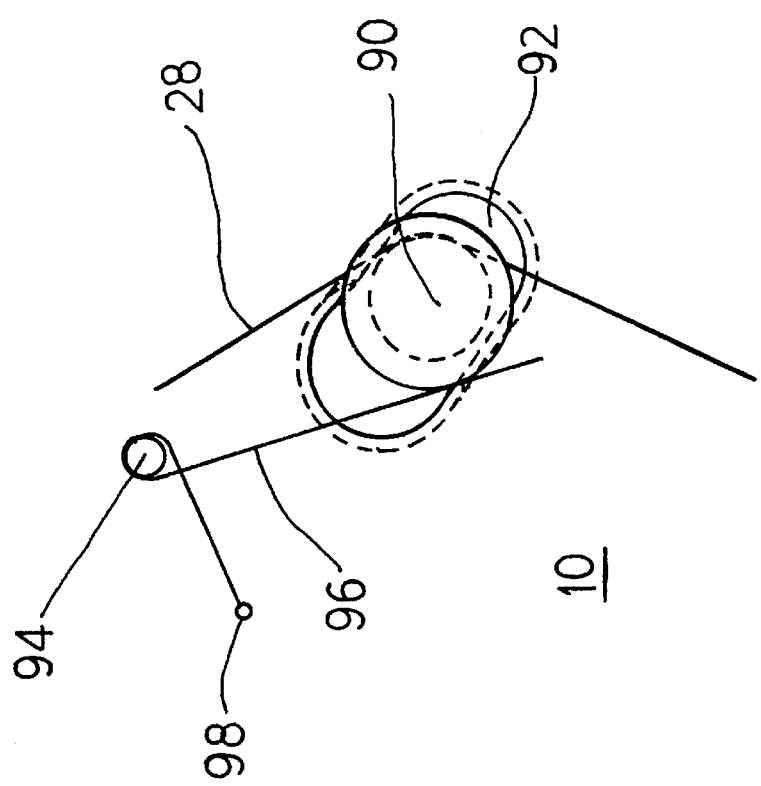
FIG. 4 is a detail of a portion of the embodiment of FIG. 3.

FIGS. 3 and 4 show a second embodiment of the invention. Two prestress assemblies are arranged at the locations as set forth in the description of FIG. 2, so that the effective location of the variable force again lies approximately in the region of the supporting pins 30 and 38 of the cartridge of the prior art (FIG. 1). The variable force in this embodiment is applied to the tape 28 by a supporting pin 90, whereby the supporting pin 90 can move in an oblong hole 92. A coil spring 26 that is plugged onto a pin 94 and secured to the base plate 10 presses against the pin 90 and forces the latter a greater or lesser distance along the oblong hole dependent on the momentary tension of the tape 28. The two prestress assemblies, that in the proximity of the guide roller 32 as well as that in the proximity of the guide roller 36, are essentially identically constructed.

FIG. 4 shows a detailed view. The oblong hole 92 with rounded ends is provided with a circumferential guide channel at the under side of the base plate 10. The pin 90 is fashioned such that its lower region can run in this guide channel, whose edge is indicated by a broken line around the oblong hole 92. Moreover, measures are undertaken to hold the pin 90 captive in the oblong hole 92. The pin 90 can move in gliding fashion in the oblong hole 92 under the influence of the coil spring 96. The coil spring 96 is placed around a pin 94, that extends essentially perpendicularly from the base plate 10, with one leg is fixed in a bore 98 in the base plate 10 and the other presses against the pin 90.

In order to test the improvements obtainable with the invention, a cartridge with known, poor playback (cartridge I) and a cartridge with poor recording properties (cartridge II) were provided with devices for the mechanical prestressing of the tape according to the present invention.

Cartridge I unmodified repeatedly exhibited a high number of poor blocks, typically 85 through 100 per track. Cassette II unmodified behaved even more poorly. A write operation is thereby only aborted when a block cannot be written after 16 attempts. This corresponds to a tape distance of more than 10 cm.

After a modification with the invention conforming to one of the embodiments of the invention, cartridge I exhibited a 75% improvement; cartridge II only required 62 write attempts per track. Similar quality improvements appeared when replacing the tapes in the cartridges and when employing other tapes having known, high error rates.

Although modifications and changes may be suggested by those skilled in the art, it is the intention of the inventor to embody within the patent warranted hereon all changes and modifications as reasonably and properly come within the scope of his contribution to the art.

I claim as my invention:

1. In a cartridge having a first reel from which a tape is unwound, said tape being wound onto a second reel, said reels being mounted on respective reel hubs, said cassette having at least two guide rollers around which said tape is guided with said tape running in substantially a straight path line between said guide rollers, the improvement comprising:

means for mechanically pre-loading said tape with a variable force while said tape is running and being disposed for acting on said tape in a region between one of said guide rollers and a reel hub disposed closest to said one of said guide rollers for controlling tension of said tape along said straight line path between said guide rollers, said means for mechanically pre-loading said tape comprising a spring-loaded pin movable along a prescribed path defined by an oblong hole in said cartridge in which said pin is engaged, said pin having a longitudinal axis disposed substantially parallel to said reel hubs.

2. In a cartridge having a first reel from which a tape is unwound, said tape being wound onto a second reel, said reels being mounted on respective reel hubs, said cassette having at least two guide rollers around which said tape is guided with said tape running in substantially a straight path line between said guide rollers, the improvement comprising:

means for mechanically pre-loading said tape with a variable force while said tape is running and being disposed for acting on said tape in a region between one of said guide rollers and a reel hub disposed closest to said one of said guide rollers for controlling tension of said tape along said straight line path between said guide rollers, said means for mechanically pre-loading said tape including a coil spring for generating said variable force.

3. In a cartridge having first and second reels with a tape entrained therebetween for winding said tape on one of said reels while unwinding said tape from the other of said reels, each reel rotating around a respective reel hub, a first guide roller disposed for guiding said tape onto and off of said first reel and a second guide roller disposed for guiding said tape onto and off of said second reel, with said tape running along a substantially straight line path between said first and second guide rollers, the improvement comprising:

first means for mechanically pre-loading said tape with a variable force while said tape is running and being disposed for acting on said tape between said first reel and said first guide roller;

second means for mechanically pre-loading said tape with a variable force while said tape is running and being disposed for acting on said tape between said second reel and said second guide roller;

said first and second means for pre-loading said tape controlling, in combination, tension of said tape along said straight line path between said guide rollers; and at least one of first or second means for mechanically pre-loading said tape comprising a spring-loaded pin movable along a prescribed path defined by an oblong hole in said cartridge in which said pin is engaged, said pin having a longitudinal axis disposed substantially parallel to said reel hubs.

4. In a cartridge having first and second reels with a tape entrained therebetween for winding said tape on one of said reels while unwinding said tape from the other of said reels, each reel rotating around a respective reel hub, a first guide roller disposed for guiding said tape onto and off of said first reel and a second guide roller disposed for guiding said tape onto and off of said second reel, with said tape running along a substantially straight line path between said first and second guide rollers, the improvement comprising:

first means for mechanically pre-loading said tape with a variable force while said tape is running and being disposed for acting on said tape between said first reel and said first guider roller;

second means for mechanically pre-loading said tape with a variable force while said tape is running and being disposed for acting on said tape between said second reel and said second guide roller;

said first and second means for pre-loading said tape controlling, in combination, tension of said tape along said straight line path between said guide rollers; and each of said first and second means for mechanically pre-loading said tape including a coil spring for generating said variable force.

* * * * *